United States Patent
Chelf (10) Patent No.: US 10,060,129 B2
(45) Date of Patent: Aug. 28, 2018

(54) INFLATABLE, RETRACTABLE LIGHT DIFFUSER, SHADING AND THERMAL INSULATION SYSTEM

(71) Applicant: Jonathan David Chelf, Solana Beach, CA (US)

(72) Inventor: Jonathan David Chelf, Solana Beach, CA (US)

(*) Notice: Subject to any disclaimer, the term of this patent is extended or adjusted under 35 U.S.C. 154(b) by 943 days.

(21) Appl. No.: 14/382,273

(22) PCT Filed: Mar. 1, 2013

(86) PCT No.: PCT/US2013/028739
§ 371 (c)(1),
(2) Date: Aug. 29, 2014

(87) PCT Pub. No.: WO2013/131048
PCT Pub. Date: Sep. 6, 2013

(65) Prior Publication Data
US 2015/0062926 A1    Mar. 5, 2015

Related U.S. Application Data

(60) Provisional application No. 61/605,715, filed on Mar. 1, 2012.

(51) Int. Cl.
*E04B 9/32* (2006.01)
*E04B 9/04* (2006.01)
*F24J 2/40* (2006.01)

(52) U.S. Cl.
CPC .............. *E04B 9/32* (2013.01); *E04B 9/0414* (2013.01); *F24J 2/407* (2013.01)

(58) Field of Classification Search
CPC ..... F21V 1/12; F21V 7/04; F21V 7/043; F21J 2/407; E04B 9/32; E04B 9/36;
(Continued)

(56) References Cited

U.S. PATENT DOCUMENTS

| 4,027,437 A | 6/1977 | Monsky et al. |
| 4,095,639 A | 6/1978 | Ryan |

(Continued)

FOREIGN PATENT DOCUMENTS

| DE | 1658916 A1 | 3/1971 |
| DE | 10033711 A1 | 1/2002 |

(Continued)

OTHER PUBLICATIONS

Supplementary European Search Report issued in European Patent Application EP 13754797.2-1605, dated Sep. 23, 2015.
(Continued)

*Primary Examiner* — Blair M Johnson
(74) *Attorney, Agent, or Firm* — Mintz Levin Cohn Ferris Glovsky and Popeo, P.C.

(57) ABSTRACT

A system and method for controlling light shading and thermal insulation in a light transmissive structure is disclosed. An array of adjacently-positioned, inflatable first tubes is provided, each of the first tubes being inflatable to abut an inflated adjacent first tube. Each of an array of inflatable second tubes is nested within, and inflatable independent of one of the first tubes. Each of the second tubes is connected to one of the first tubes such that when not inflated, each of the second tubes is flattened within the one of the first tubes. When inflated, each of the second tubes abut an inflated adjacent second tube via first tubes. The first tubes are preferably clear, while the second tubes are made of a reflective material.

9 Claims, 11 Drawing Sheets

(58) Field of Classification Search
CPC .. E04B 9/364; E04B 9/386; E04B 2009/2405; E04B 2009/2423; E04B 2009/2627; E04B 9/262; E04B 9/0414; A01G 9/225; E06B 9/32; E06B 9/36; E06B 9/364; E06B 9/386; E06B 2009/2405; E06B 2009/2423; E06B 2009/2627; E06B 9/262
See application file for complete search history.

(56) References Cited

U.S. PATENT DOCUMENTS

| | | | | |
|---|---|---|---|---|
| 4,290,242 | A | * | 9/1981 | Gregory, Jr. ........... A01G 9/225 47/17 |
| 4,297,813 | A | * | 11/1981 | Farrell ................... A01G 9/225 47/17 |
| 4,301,626 | A | * | 11/1981 | Davis .................... A01G 9/225 47/17 |
| 2002/0191295 | A1 | | 12/2002 | Hagenbach et al. |
| 2010/0212719 | A1 | | 8/2010 | Stolum |

FOREIGN PATENT DOCUMENTS

| | | | |
|---|---|---|---|
| FR | 2602536 | A3 | 2/1988 |
| GB | 1021312 | A | 3/1966 |
| GB | 1385261 | A | 2/1975 |
| JP | H04001351 | A | 1/1992 |
| JP | H04108988 | A | 4/1992 |
| JP | H10-172337 | A | 6/1998 |
| JP | 6177810 | B2 | 8/2017 |
| KR | 20-0362109 | Y1 | 9/2004 |
| KR | 2010-0023427 | A | 3/2010 |
| WO | WO 8102659 | A1 * | 10/1981 |
| WO | WO-2009-105587 | A2 | 8/2009 |
| WO | WO-2013/131048 | A1 | 9/2013 |

OTHER PUBLICATIONS

International Search Report Issued in PCT/US2013/028739 dated Jul. 25, 2013.

* cited by examiner

INFLATABLE, RETRACTABLE LIGHT DIFFUSER, SHADING AND THERMAL INSULATION SYSTEM

CROSS-REFERENCE TO RELATED APPLICATIONS

This application is a national stage application, filed under 35 U.S.C. § 371, of International Application No. PCT/US2013/028739, filed Mar. 1, 2013, titled "Inflatable, Retractable Light Diffuser, Shading and Thermal Insulation System," which claims priority to U.S. Provisional Application No. 61/605,715, filed Mar. 1, 2012, titled "Inflatable, Retractable Light Diffuser, Shading and Thermal Insulation System," the contents of which are hereby fully incorporated by reference.

BACKGROUND

This document relates to a structure, and more particularly to an inflatable, retractable light diffuser, shading and thermal insulation system for a structure.

Sunlight collecting structures such as solariums and greenhouses can be susceptible to rapid heat loss during periods of cold and/or dark outside conditions. This heat loss can require large amounts of heat energy inputs to maintain desired internal temperatures. Additional, people and plants can benefit from controllable levels of diffused, non-direct, sunlight.

SUMMARY

This document describes a system and method for providing controllable levels of diffused, non-direct, sunlight or thermal insulation for a light transmissive structure. An inflatable and retractable light diffuser for shading and thermal insulation for a structure is formed of a number of nested tubes, at least a portion of which being each independently inflatable. Each of the number of nested tubes can either be transparent, i.e. clear or translucent, or can be non-transparent, i.e. of varying opaqueness or reflectivity.

The implementations described herein are versatile, and enable rapid control of light levels, light diffusion, and thermal insulation. The implementations have few moving parts, are lightweight, and low-cost.

An apparatus is provided, in some implementations, controlling light shading and thermal insulation in a light transmissive structure. The apparatus includes an array of adjacently-positioned, inflatable first tubes, each of the first tubes being inflatable to abut an inflated adjacent first tube; an array of inflatable second tubes, each of the second tubes being nested within, and inflatable independent of, one of the first tubes, each of the second tubes being connected such that when not inflated, each of the second tubes is flattened and substantially vertical within the one of the first tubes, and when inflated, each of the second tubes abut an inflated adjacent second tube via first tubes.

The following optional features may be present in the apparatus in any suitable combination. At least some of the first tubes in the apparatus can be translucent. At least some of the second tubes of the apparatus can be opaque. In the apparatus, each of the second tubes can be inflatable to block passage of light through the inflated second tubes. In such apparatuses, the opaque portion can include a top half of the at least some of the second tubes. The apparatus can further include an array of inflatable third tubes, each of the third tubes being nested within, and inflatable independent of, one of the second tubes. Such apparatuses can further include an array of inflatable fourth tubes, each of the fourth tubes being nested within, and inflatable independent of, one of the third tubes.

In a related aspect, provided herein is an apparatus for controlling light shading and thermal insulation in a light transmissive structure. The apparatus includes an array of adjacently-positioned, inflatable first tubes, each of the first tubes being inflatable to abut an inflated adjacent first tube; an array of inflatable second tubes, each of the second tubes being connected to both a top and bottom of an inner surface, and inflatable independent of, one of the first tubes, each of the second tubes being connected such when not inflated, each of the second tubes is flattened and substantially longitudinal within the one of the first tubes, and when inflated, each of the second tubes abut an inflated adjacent second tube via first tubes; and opposing chambers of the first tube opposite the second tube are independently inflatable to create a pressure differential therebetween, the pressure differential causing a curvature in the non-inflated second tube away from a chamber with a greater pressure to provide a controlled light guiding by the second tube. The apparatus can be such that each of the first tubes is clear and each of the second tubes is reflective.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes an inflatable and retractable light diffuser apparatus, system and method for controlled shading and thermal insulation for a structure. In some implementations, an apparatus and system is formed with a number of nested tubes, at least a portion of which being each independently inflatable. Each of the number of nested tubes can either be transparent, i.e. clear or translucent, or can be non-transparent, i.e. of varying opaqueness or reflectivity.

In some implementations, a light diffuser and thermal insulator includes a number of nested tubes. Each tube of the nested tube is inflatable, such that when inflated, forms a ceiling below a light-transmitting roof of a structure, such as a solar building or greenhouse, for example. In some preferred implementations, the tubes span a full length of the light transmitting roof, and are arranged together such that adjacent tubes, when inflated, span a full length and the full width of the light transmitting roof so as to create a ceiling with no interchange of air above and below this ceiling.

Figure 11:
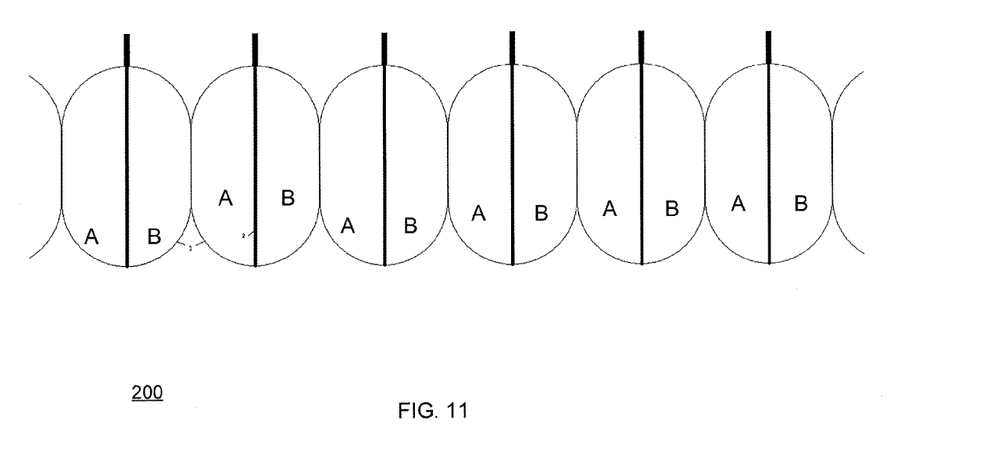
FIG. 11 illustrates a light diffuser and thermal insulation system with inner tubes fully deflated and where the reflective inner tube attaches to the outer tube near the top and near the bottom of each tube set.
Figure 12:
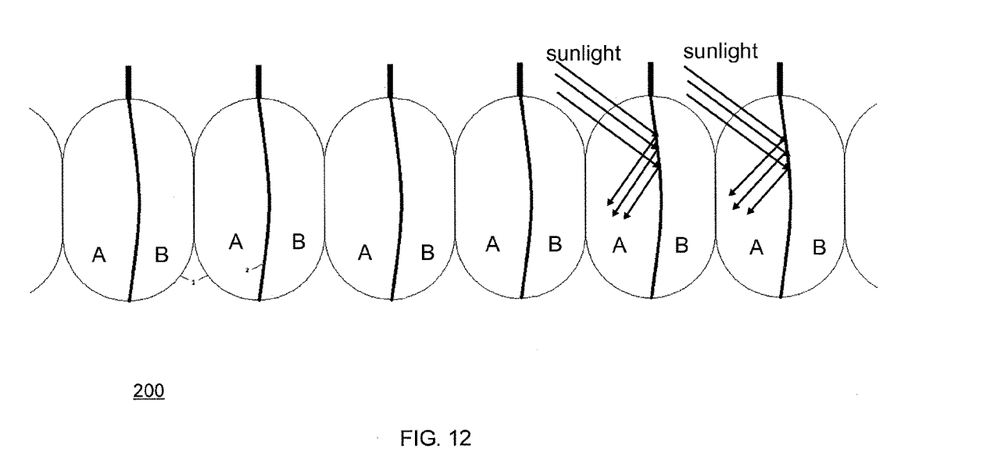
FIG. 12 illustrates a light diffuser and thermal insulation system with inner tubes fully deflated and where the reflective inner tube attaches to the outer tube near the top and near the bottom of each tube set with a slight differential pressure inside the outer tube.
Figure 13:
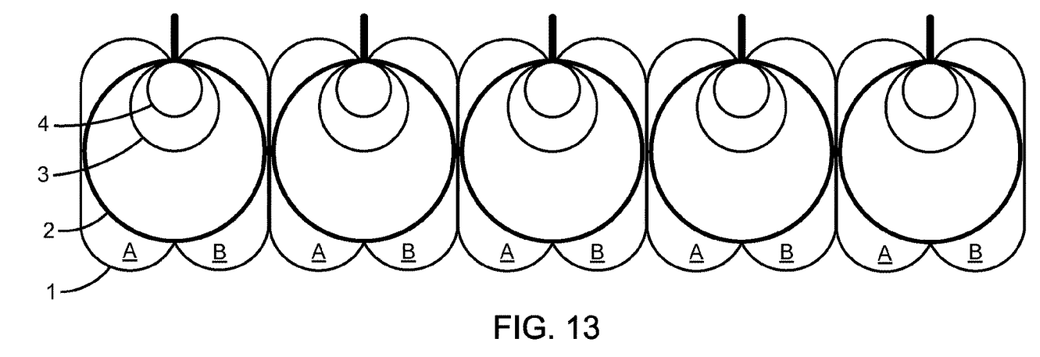
FIG. 13 illustrates a light diffuser and thermal insulation system with inner tubes fully inflated and where the reflective inner tube attaches to the outer tube near the top and near the bottom of each tube set.

The tubes are supported by cables or similar supporting members, which traverse the width of the light transmitting roof and connect to an upper edge of the tubes through one or more eyelets or other slidable or retractable mechanism. The cables can be located at regular intervals along the length of the inflatable tubes. The cables may be substantially horizontal or angled to follow the roofline or to intercept a greater amount of winter sunlight with east-west oriented tube sets. The embodiment illustrated in FIGS. 11, 12, and 13 is advantageous for the effective capture and inward diffusion of low-angle, winter sunlight with east-west oriented tube sets and either horizontal or angled support cables. An air beam within the upper edge of each tube set can be provided as an additional, lightweight support running substantially the length of each tube set. In some implementations, one end of the tubes is connected to an air pressure manifold, as described in further detail below, which can also be flexible and retractable.

Figure 1:
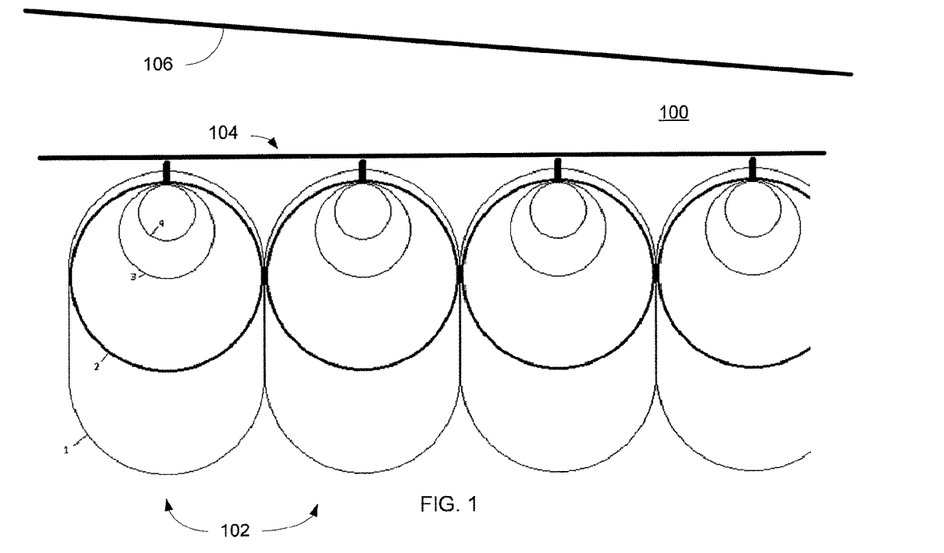
FIG. 1 illustrates light diffuser and thermal insulation system using a fully nested tube arrangement.

FIG. 1 illustrates light diffuser and thermal insulation system 100 using a fully nested tube arrangement. The system 100 includes an array of adjacently-positioned tube members 102 connected to and below a supporting cable 104. Each tube member 102 includes a first tube 1 and a second tube 2. In some implementations, as shown in FIG. 1, the tube member 102 can include a third tube 3 and a fourth tube 4, and can include further tubes if necessary. The first tube 1 is an outer, transparent tube that contacts the external sides of immediately adjacent outer first tubes 1 when outer tubes 1 are inflated in order to provide a sealed air space between the upper portion of the outer tubes 1 of the system 100 and the light transmitting roof 106.

Second tube 2 is a nested, reflective tube, located inside first tube 1, and can be inflated to contact the internal sides of at least semi-inflated, outer first tube 1 when second tube 2 is inflated to provide a sealed air space above and below reflective second tube 2. As shown in FIG. 1, reflective second tube 2 reflects both solar and thermal radiation. In some implementations, the upper radius of the reflective second tube 2 can be suspended somewhat below the upper radius of inflated first tube 1 when the second tube 2 is inflated, thereby producing an additional insulating air gap, i.e. insulating thermal energy within the tube set defined by the lower surface of the upper portion of first tube 1 and the upper surface of the upper portion of second tube 2.

If provided, third and/or fourth tubes 3 and 4 can be inflated to provide various degrees of expansion of reflective second tube 2 when the second tube 2 is deflated or partially inflated, for varying degrees of shade and/or thermal insulation. For instance, in one example implementation, nested third tube 3 is located inside second tube 2. When inflated, the third tube 3 can expand non-inflated second tube 2, thereby reflecting only a portion of solar radiation back through the light transmitting roof, in a shading mode. Further, if a fourth tube 4 is provided within third tube 3, the fourth tube 4 is of a smaller circumference or diameter than third tube 3. When inflated, the fourth tube 4 expands non-inflated second and non-inflated third tubes 2 and 3, thereby reflecting less solar radiation back through the light transmitting roof 106, relative to what would be reflected by inflated third tube 3. Additionally, gradually smaller-diameter tubes can be provided within the other tubes described above for further gradations of shading, light reflection, and/or thermal insulation.

Figure 2:
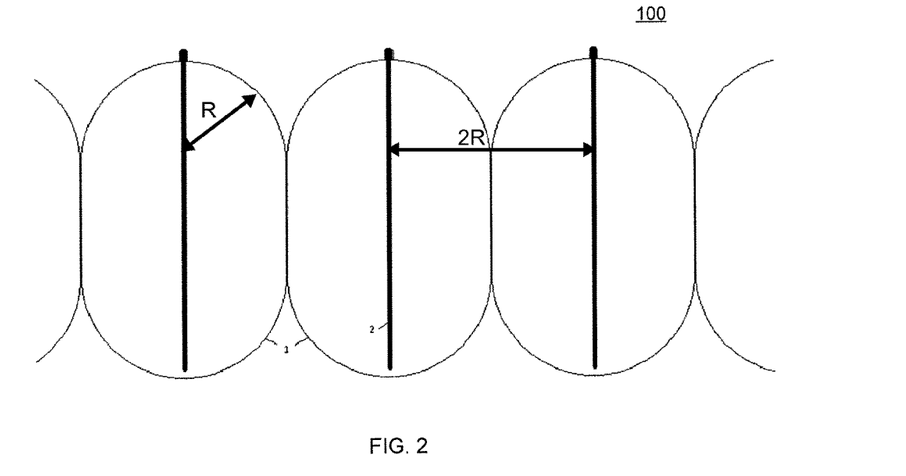
FIG. 2 illustrates light diffuser and thermal insulation system with inner tubes fully deflated.

FIG. 2 illustrates the light diffuser and thermal insulation system 100 in which all tubes except first tube 1 are deflated. The non-inflated, reflective second tube 2 can be substantially flat or planar, and act as light diffuser for passage of solar energy into a structure. Inflated first tubes 1 allow for limited, controlled escape of thermal energy from inside the structure. A fully reflective and free hanging second tube 2 of minimal circumference, $2\pi R$, requires that the circumference of first tube 1 be at least $4(\pi-1)R$, (i.e. 8.57R), where R is the upper and lower radius of inflated first tube 1. As shown in FIG. 2, the distance between the mid-point of each tube member to the next is 2R. A smaller first tube 1 circumference would allow the lower portion of the fully reflective second tubes 2 to fold at the bottom of inflated tubes 1 thereby reflecting (losing) a portion of solar radiation back through the light transmitting roof. In some implementations, it is not desirable to allow reflection of any radiation back through the roof, and so it is requisite that the circumference of the first tube 1, as seen in the cross sectional view shown in FIG. 2, is sufficiently great to allow the lower portion of the second tube 2 to dangle freely. If the light diffuser and thermal insulation system 100 were mounted under an angled or curved structure, the array of first tubes 1 could be substantially angled or curved accordingly, while second tubes 2, when deflated, could hang substantially vertically.

Figure 3:
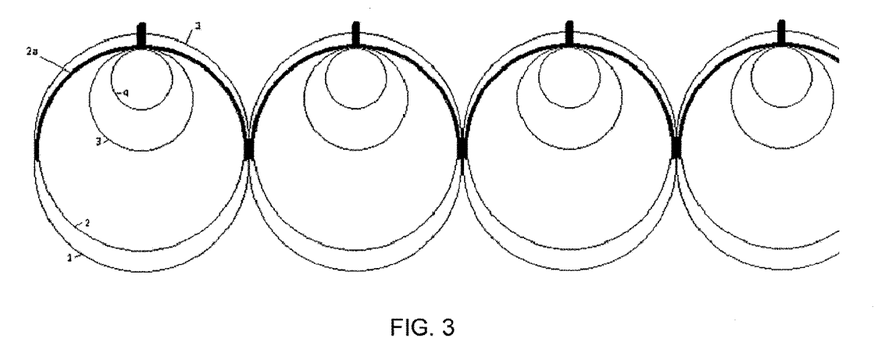
FIG. 3 illustrates light diffuser and thermal insulation system in which inner second tubes are partially covered with a reflective material.

As shown in FIG. 3, if second tubes 2 are only reflective on the upper portion of the tubes 2, and clear or less reflective on the lower portion of the tubes 2, then the minimum circumference of the first tubes 1 needs to be larger than $2\pi R$, (i.e. 6.28R and therefore 2.29R less than that required with fully reflective second tubes 2). This reduces the resulting light diffusion from a reflective coating on only the upper portion of tubes 2 due to substantially half of the vertical height of the reflective portion of deflated second tubes 2. This same effect can be accomplished by transparent second tubes 2 with reflective film sheets 2a hanging adjacent to each outside upper portion of second tubes 2. Since the implementation shown in FIG. 3 is less sensitive to the bottom of the second tubes 2 hanging freely when deflated, the largest of the tube members or tube set, the first tubes 1, need not be extremely larger than the second tubes 2. This can be convenient when variable shading is needed while impeding air flow or convection above the ceiling created by the tube array and vertical space within the overall structure or building is scarce or when objects within the structure or building are in danger of impinging the tubes.

Figure 4:
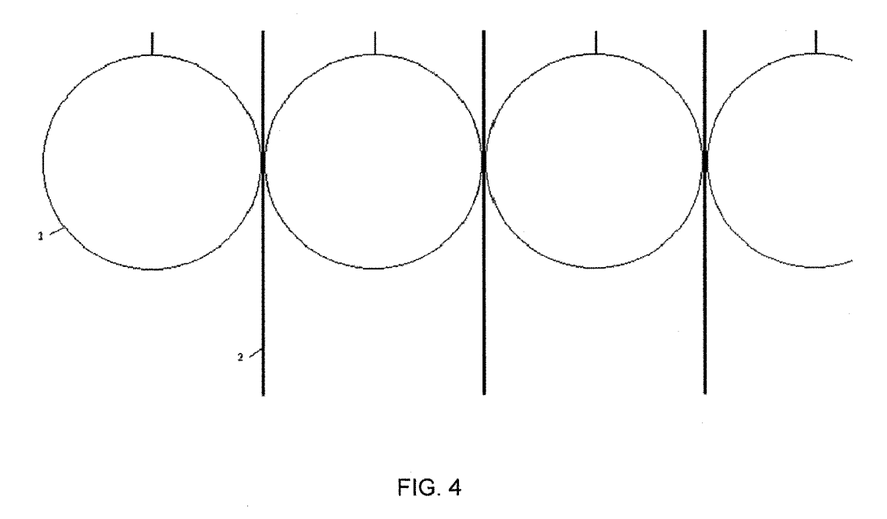
FIG. 4 illustrates light diffuser and thermal insulation system with reflective tubes alternated with transparent tubes.
Figure 5:
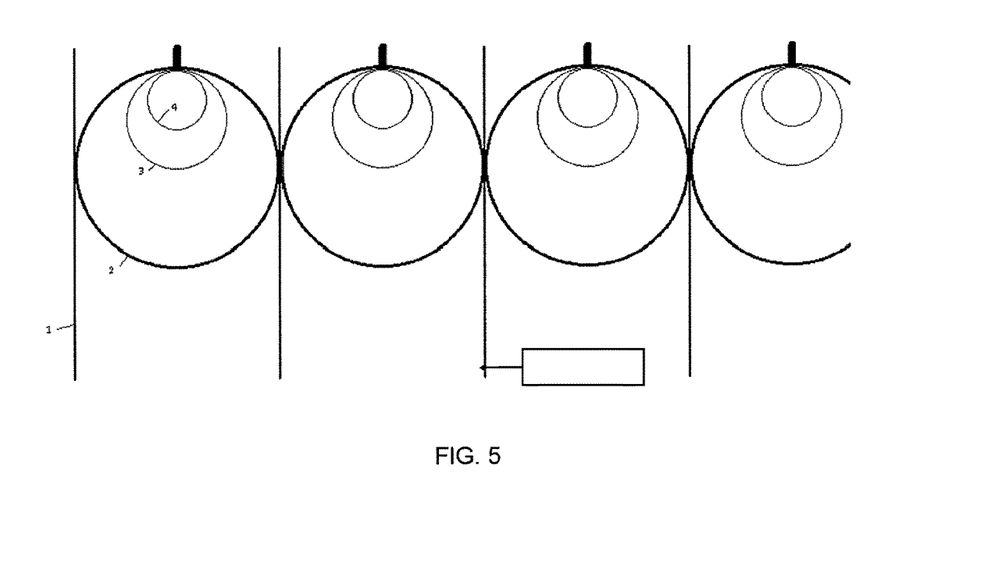
FIG. 5 illustrates light diffuser and thermal insulation system with reflective tubes adjacent deflated transparent tubes.

FIGS. 4 and 5 illustrate various implementations using an alternating tube arrangement. First and second tubes 1 and 2, respectively, are adjacent to each other in an alternating pattern. If provided, third and fourth, and other, tubes 3, 4, etc. are nested inside second tubes 2 only to provide the same reflection of a portion of solar radiation (shading) as in a fully nested tube arrangement described above.

FIG. 4 shows transparent first tubes 1 in contact with adjacent deflated, reflective second tubes 2 when first tubes 1 are inflated, to provide a sealed air space between the upper portion of first tubes 1 and the light transmitting roof. FIG. 5 shows reflective second tubes 2 in contact with adjacent deflated first tubes 1. The reflective second tubes 2 are inflated in FIG. 5, and in this configuration, second tubes 2 provide a sealed air space between the upper portion of second tubes 2 and the light transmitting roof, as well as reflecting solar and thermal radiation.

Third tubes 3 and fourth tubes 4 are shown inflated in FIG. 5 to display the relative sizes that can exist between nested tubes. When the second tubes 2 are inflated, it is not necessary that the third tubes 3 and fourth tubes 4 be inflated as well. In the event that partial air flow around the tube array is desired with some reflection of solar and thermal radiation, the second tubes 2 can be deflated and either the third tubes 3 or fourth tubes 4 can be inflated. In such a configuration, the portion of the structure or building below the now partially open ceiling formed by the tube array can allow warmer air to rise through the spaces made available by only inflating the third tubes 3 or fourth tubes 4. This movement of air in conjunction with the partial shade provided by the reflective covering of deflated second tubes 2 draped against the smaller tubes which are inflated can help to cool the lower portion of the structure or building.

Tube Properties

Outer, first tubes 1 are preferably transparent, and are formed of a flexible, yet inelastic, membrane transparent to a predetermined portion of solar radiation. First tubes 1 may be formed of a material that absorbs UV radiation. Alternatively, first tubes 1 can be made of material that transmits UV radiation. The first tubes 1 can be made of a combination of materials that selectively absorb and transmit UV radiation. In other implementations, first tubes 1 may be transparent to thermal infrared radiation, may be absorbing of thermal infrared radiation, and/or may be reflecting of thermal infrared radiation. The ability to reflect thermal infrared radiation (i.e. long wavelength IR radiation) can be accomplished by making any of the tubes from materials including any material that reflects radiation of a suitable wavelength, as well as materials that include a coating of tin oxide or similar visible light transmitting thermal reflector.

In some implementations, at least some of the first tubes 1 are formed of an inelastic, a thermal infrared transparent material, such as untreated polyethylene, coated with tin oxide or similar on one side of the transparent material. This can make a composite material that is thermally reflective from both sides and many directions. On the other hand, a thermal infrared absorbing material, such as infrared-treated polyethylene, can be coated with tin oxide, or a similar material, on both sides of the thermally absorbing material to produce a composite material that is thermally reflective from both sides. These implementations are functionally similar, but may vary in cost and therefore, desirability.

The first tubes 1 can also be reflecting of thermal infrared radiation as with a coating of tin oxide, or similar visible light transmitting thermal reflector, on the lower radius only of first tubes 1. First tubes 1 can also be reflecting of thermal infrared radiation as with a coating of tin oxide, or similar visible-light-transmitting, thermal reflector on the upper radius only of first tubes 1.

Outer, transparent first tubes 1 must have an inflated circumference of at least $4(\pi-1)R$ (i.e. 8.57R), where R is the upper and lower radius of inflated first tubes 1, in order for the non-inflated, fully reflective second tubes 2 of minimal circumference, $2\pi R$, to hang freely inside inflate first tubes 1, as shown in FIG. 2. A smaller first tube 1 circumference would allow the lower portion of the fully reflective second tubes 2 to fold at the bottom of inflated first tubes 1 thereby reflecting (i.e. losing) a portion of solar radiation back through the light transmitting roof. When the goal is to allow as much solar radiation to pass the ceiling formed by the tube array without allowing heated air to escape, such as when trying to rapidly heat the lower portion of the structure or building, it can be desirable to have a configuration such as that show in FIG. 2 where the bottoms of the second tubes 2 are allowed to dangle freely.

If second tubes 2 are only reflective on their upper portion, and clear on their lower portion, then the minimum circumference of first tubes 1 is somewhat larger than $2\pi R$ (i.e. 6.28R and therefore 2.29R less than that required with fully reflective tubes 2), as described above. In either implementation for reduced diffusion, the portion of the reflective surface can range from that which only covers the entire upper portion of inflated second tubes 2 to that which does not contact the lower inside surface of inflated first tubes 1, while all other tubes are deflated.

On-center spacing between adjacent first tubes 1 is 2R when deployed (i.e. not retracted, or fully inflated). Reflective second tubes 2 are formed of a flexible, inelastic membrane, and are reflective of both solar radiation and thermal radiation. Reflective, second tubes 2 can have a solar and thermal reflective coating (aluminum or similar) on both their inner and outer surfaces. In alternative implementations, reflective second tubes 2 may have a solar and thermal reflective coating (aluminum or similar) on their inner surface only, provided the flexible membrane of second tubes 2 is transparent to solar and thermal radiation. In yet other implementations, reflective second tubes 2 may have a solar and thermal reflective coating (aluminum or similar) on their outer surface only, provided the flexible membrane of second tubes 2 is transparent to thermal radiation. In still yet other implementations, reflective second tubes 2 may have a solar and thermal reflective coating (aluminum or similar) on substantially their upper half only, provided the flexible membrane of second tubes 2 is transparent to solar and thermal radiation. This configuration for the second tubes 2 can reduce the minimum circumference of tubes 1, as stated above, and can further reduce the degree of light diffusion of deflated second tubes 2.

In a fully nested tube arrangement, second tubes 2 may include a flexible membrane that is transparent to solar and thermal radiation and solar and thermal reflective flexible film sheets 2a adjacent to substantially the upper half of the outer surfaces of second tube 2, as shown in FIG. 3. This can reduce the minimum circumference of first tubes 1, as stated above. Further, this can reduce the degree of light diffusion of deflated second tubes 2. When provided, sequentially smaller tubes, such as third, fourth, fifth, and more tubes 3, 4, 5, etc., can be formed of any suitable flexible, inelastic membrane, and may be formed of a thermally reflective material, or a thermally transmitting material.

Figure 6:
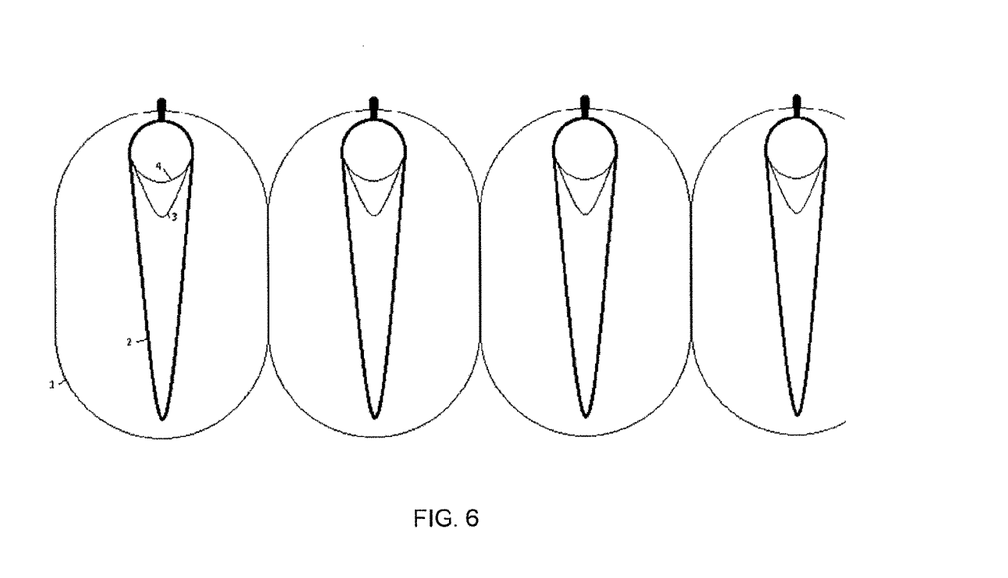
FIG. 6-8 illustrates light diffuser and thermal insulation systems with varying degrees of shading and/or thermal insulation according to varying degrees or numbers of inflated inner tubes.
Figure 7:
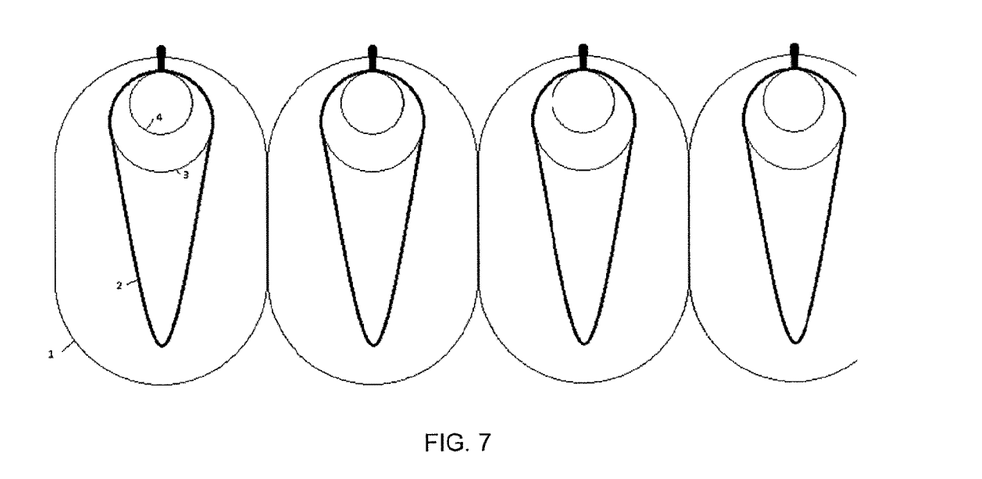
Figure 8:
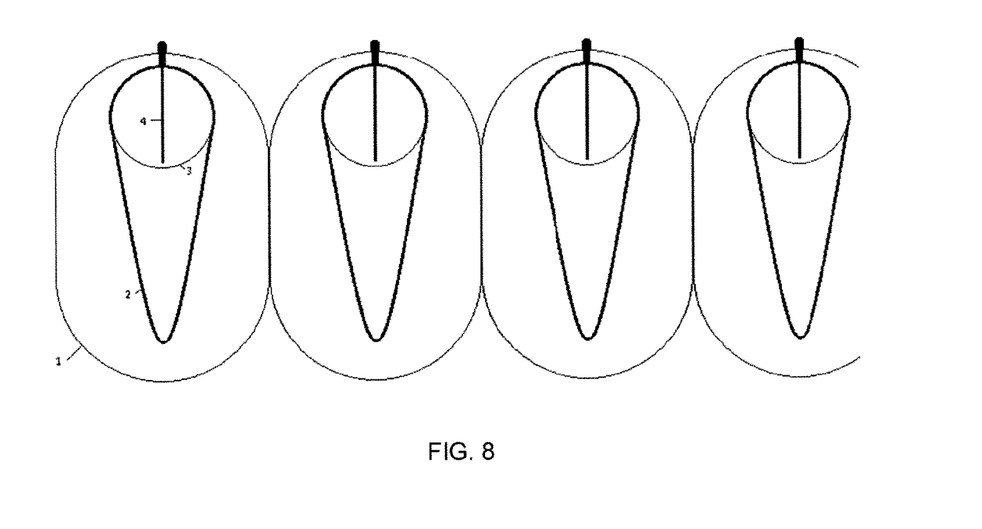

Pressure Parameters:

In a tube array of tube members, pressure p0 is the pressure outside first tube 1. P0 can be thought of as the atmospheric or ambient pressure. A pressure p1 is the pressure inside the first tube 1 and outside the second tube 2. A pressure p2 is the pressure inside tube 2 and, if provided, outside tube 3. If provided for, p3 is pressure inside tube 3 and, if provided, outside tube 4. If provided for, p4 is pressure inside tube 4 and, if provided, outside tube 5. Such pressure parameters can continue for additional inner tubes. For discrete, variable reflective shading, as illustrated in FIGS. 6-8, one or more levels of shading can be provided, e.g. 30% shading (fourth tube 4 inflated—FIG. 6), 50% shading (third tube 3 inflated—FIGS. 7 and 8). Noncritical control of inflation pressures is provided with differential pressures of approximately 0.1 inch (0.25 cm) of water column (typical operating pressures: $p0 \leq p1 \leq p2 \leq p3 \leq p4 \ldots$). For infinitely variable, reflective shading (e.g. 20%-100% shading), an elastic, radially expandable third tube 3 can be provided inside reflector second tube 2 and the pressure inside the elastic third tube 3 can be controlled, i.e. control of p3–p2, thereby controlling the diameters of tubes 3 and therefore the degree of reflective shading. Additionally, when shading and a partial ceiling that allows for air flow, or convection, are desirable, the first tubes 1 can be deflated while any of the third or fourth tubes 3 or 4 can be inflated.

As illustrated in FIGS. 11, 12, and 13, the alternate embodiment of the light diffuser and thermal insulation system in which the reflective inner second tube 2, which attaches to the outer first tube 1 near the top and near the bottom of each tube set, defines two volumes, A and B, within first tube 1. This allows for the air pressure P1A within volume A to differ from the air pressure P1B within volume B. The resulting differential pressure, P1A–P1B, will induce curvature in both second tube 2, and the sides of contact between adjacent first tubes 1. This induced curvature of reflective second tube 2 can be useful for the capture and controlled inward diffusion of sunlight inside the structure. In FIG. 12, rays of sunlight, incident at a low angle above the horizon, such as might occur at sunrise or sunset, are shown. These rays are shown as incident upon the curved upper portions of the second tubes 2 and are shown as deflected downwards. This type of configuration can be useful when increased radiation in the lower portion of the structure or building is desired, such as when desiring to warm that volume in the morning, after a cold night.

Figure 9A:
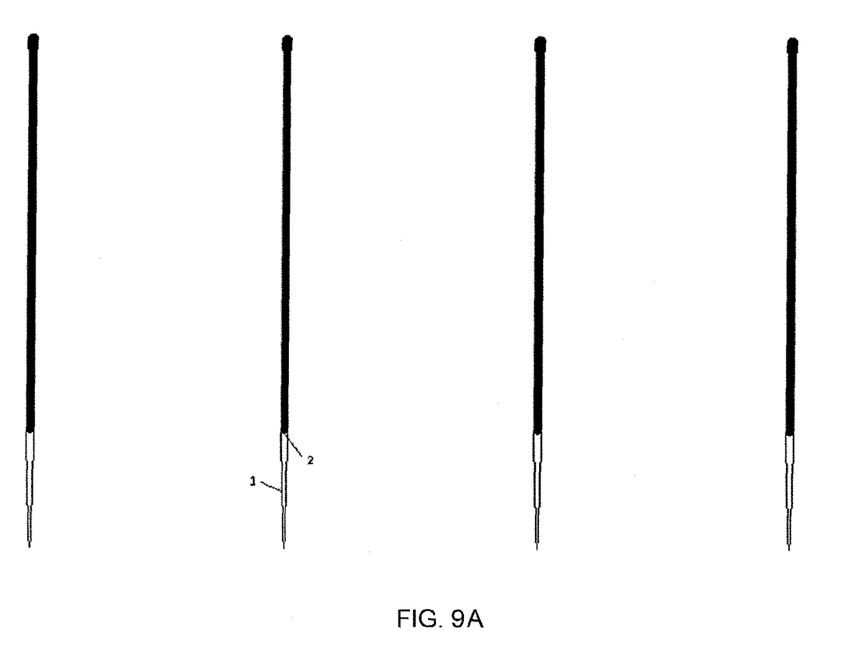
FIG. 9A illustrates light diffuser and thermal insulation system with all tubes deflated for maximum light transmission and light diffusion with minimal thermal insulation, in cross-sectional view.
Figure 9B:
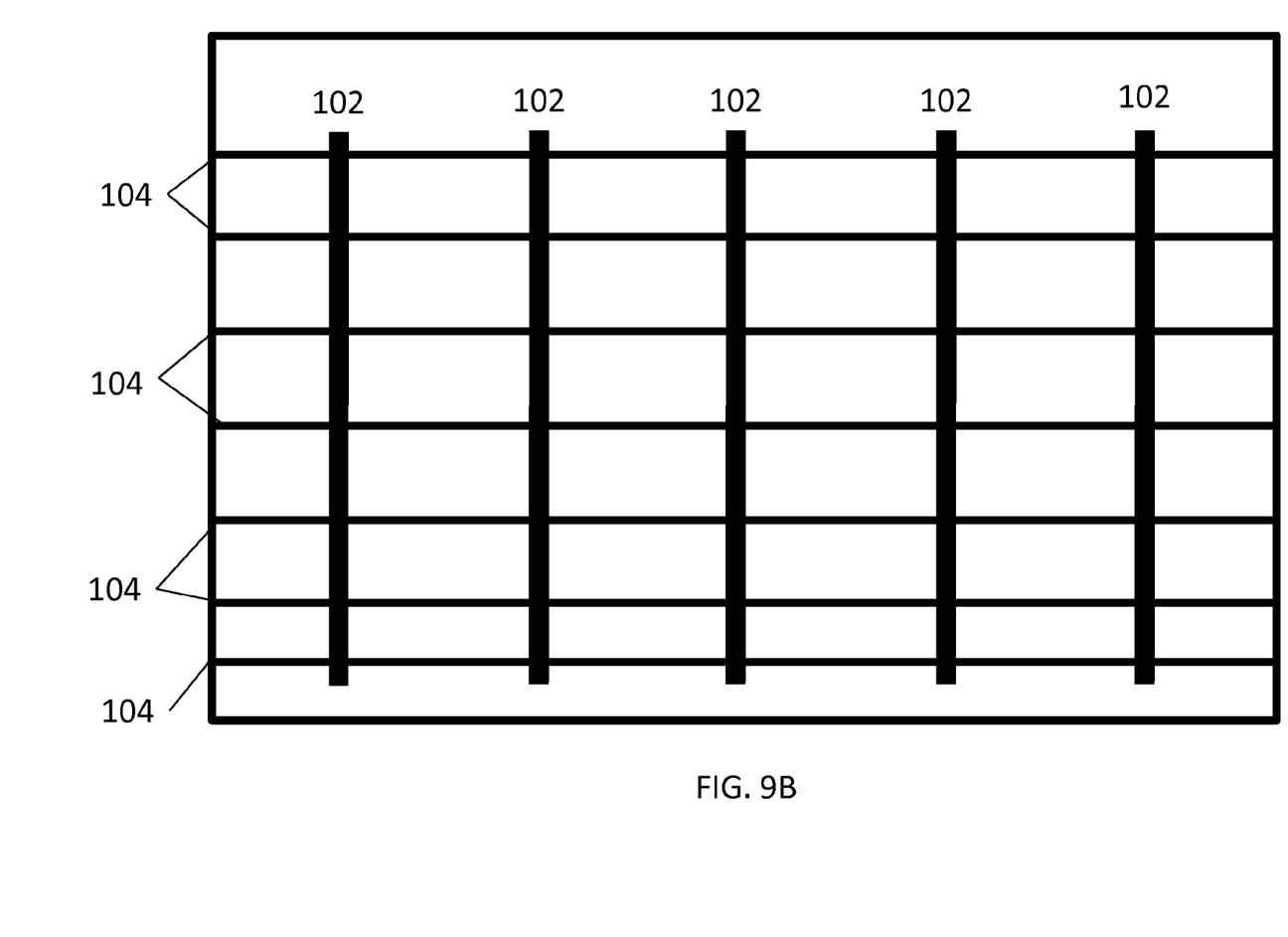
FIG. 9B illustrates light diffuser and thermal insulation system with all tubes deflated for maximum light transmission and light diffusion with minimal thermal insulation, viewed from above.

Modes of Operation:

FIG. 9A illustrates a mode of operation in which all tubes are deflated, shown in cross-section. This mode of operation can provide a mode of high light transmission with light diffusion and no thermal insulation. In this configuration, warm air could rise rapidly, and solar radiation could reach the lower portion of a structure or building quickly to increase such convection of air. FIG. 9B is a view of the same mode of operation, that in which all tubes are deflated, but from a top-down view, seen from above the tube array. From this view, it can be seen that the deflated tubes would not impede much solar radiation, particularly when the sun were directly overhead the structure or building.

FIG. 2 illustrates a mode of operation in which only first tubes 1 are inflated, providing a mode of moderately high light transmission with light diffusion and minimal thermal insulation for thermal radiation transmitting first tubes 1; or moderate thermal radiation insulation for thermal absorbing first tubes 1; or good thermal insulation for thermal radiation reflecting first tubes 1. In some instances, such a configuration can reduce the amount of shading while providing a guide for solar radiation from the volume above the ceiling created by the tube array to the volume below while maintain the aforementioned thermal insulation.

FIG. 1 illustrates a mode of operation in which first and second tubes 1 and 2, respectively, are inflated. Although FIG. 1 show additional tubes within the second tubes inflated, the additional tubes can be absent or deflated. This mode provides minimal light transmission and maximum thermal insulation with good thermal insulation for thermal radiation absorbing first tubes 1; or optimal thermal insulation for either thermal radiation transmitting or thermal radiation reflecting first tubes 1. Depending upon the material of the first and second tubes 1 and 2, and the degree of inflation of tubes 1 and 2, it is possible that no light is transmitted from the volume between the roof and the ceiling created by the tube array to the volume below the ceiling.

Similarly, FIG. 13 illustrates a mode of maximum insulation for an alternate implementation of the light diffuser and thermal insulation system in which the reflective second tube 2 attaches to the transparent first tube 1 in two locations. The first point where the second tube 2 attaches to the first tube 1, can be near the top and the second point can be near the bottom of each tube set. These modes of operation, in conjunction with a full ceiling created by the full width of tube sets and full length of tube sets and the perimeter sealing as outlined in the description of FIG. 10A and FIG. 10B, below, illustrates modes of maximum overall insulation, for their respective implementations, with the lowest heat losses due to conduction, convection, and radiation. In contrast, the mode of maximum insulation for the alternative implementation of alternating tubes 1 and tubes 2, represented by FIG. 5, will have lower overall insulation than that represented by FIG. 1 or FIG. 13 due to higher conductive heat loss because of fewer insulating layers in series with the heat flow. That is to say, because the tubes in FIG. 5 are not nested, transmission of heat across the ceiling made by the tube array may be different than in an array of nested tubes, with multiple layers through which heat must be transferred, as shown in FIG. 1 or FIG. 13.

In yet another mode of operation, third tubes 3, fourth tubes 4, and/or fifth tubes 5, etc. can be individually or solely inflated, while surrounding tubes and interior tubes are deflated. This mode can provide a desired degree of shading with light diffusion and little or no thermal insulation. In still yet another mode of operation, all tubes can be retracted, or the entire system can be moved out from under at least most of the light transparent roof, providing a mode of maximum light transmission, such that the light experiences little diffusion or other distortion, that also can have little to no thermal insulation.

Figure 10A:
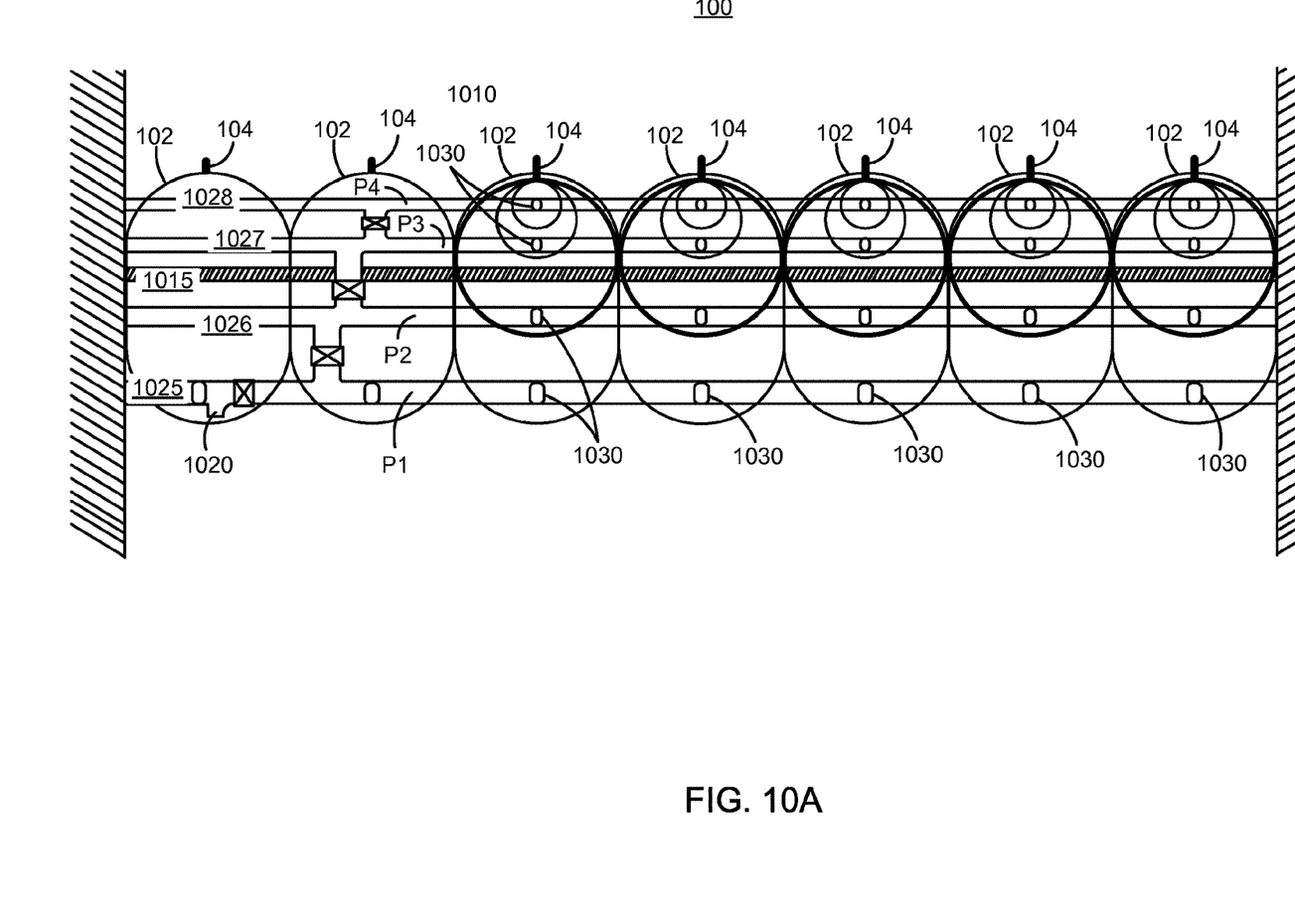
FIG. 10A shows a system in which one end of the tubes is connected to an air pressure manifold, shown in cross-section.
Figure 10B:
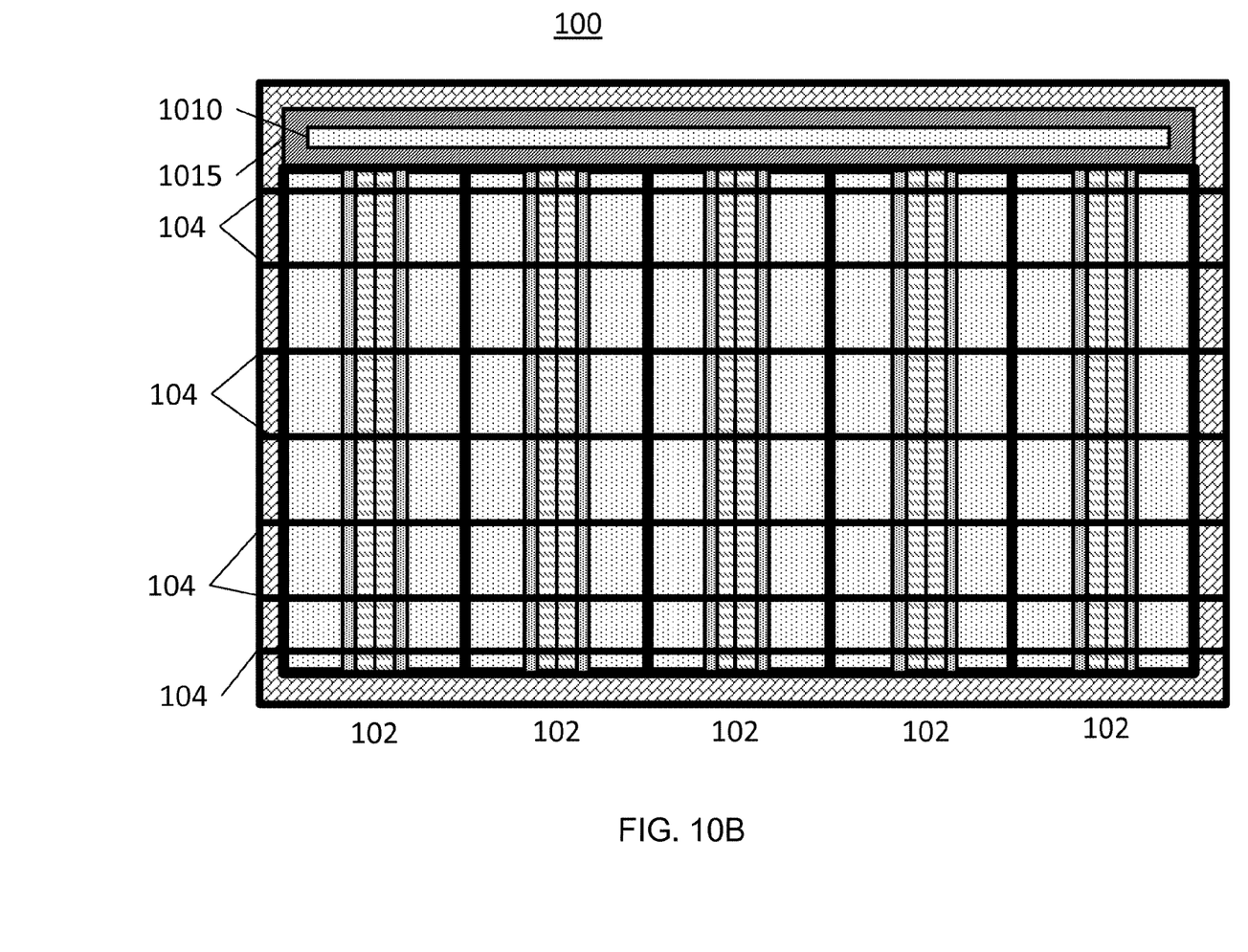
FIG. 10B shows the system of FIG. 10A seen from above.

FIGS. 10A and 10B shows a system 100 in which one end of each of the tube members 102 is connected to an air pressure manifold 1010, which may be flexible and retractable. FIG. 10A is the cross-sectional view, while 10B is the view from above the tube members 102. The tube members 102 are each supported by a plurality of supporting cables 104 or other suitable supporting structures that allow for suspension of the tube members 102 above an open space in a structure or building. The supporting cables 104 can span the width of the array of tube members 102 and can be spaced at suitable intervals along the length of the members 102. The intervals between the supporting cables 104 can be regular or varied, so long as the tube members 102 are kept in a suitable orientation and prevented from excessive and undesired sagging or other deformation.

Shown in FIGS. 10A and 10B are tube members 102 that include a first tube with a second, third, and fourth tube each within each other and connected at one point near where the supporting cable 104 attached to the tube member 102. The first, second, and subsequent interior tubes in FIGS. 10A and 10B are all shown as inflated, but it is not necessary that all tubes be inflated during operation of a system in this configuration.

Also shown in FIGS. 10A and 10B is a means to seal 1015, the air above the tubes and below the light transmitting roof from the air below the tubes. This means to seal 1015 is shown as located near the air pressure manifold 1010, such that when actuated, the means to seal 1015 will contact the end of the tube members 102 near the air pressure manifold 1010. The means to seal 1015 can contact the tube members 102, as well as one or more walls, or portions thereof, when in use. Additionally, the means to seal 1015 can prevent air flow from the volume below the ceiling created by the tubing array to the volume between the roof and the created ceiling by sealing any passage ways that may be present between the ends of the tube members 102 and the wall of the structure, such as areas surrounding the air pressure manifold 1010.

The means to seal 1015 is shown as a sealing beam, such as an air beam, that runs the entire width of the structure and tube assembly. This sealing beam 1015 provides a seal between the ends of the tube members 102 and the structure wall while simultaneously providing the flexible pressure manifold 1010 access to each of the tube members 102 in the tube assembly. The tube assembly may be of sufficient length and width to seal directly to the 3 remaining walls of the structure. Alternately, sealing beams or other sealing means 1015 may be provided between the perimeter of the tube members 102 in the tube assembly and the walls of the structure. Any of these methods of sealing can create an airtight ceiling and thus prevent the convective loss of heat through the interchange of air above and below the tube assembly.

The air pressure manifold 1010 can have more than one portion 1025, 1026, 1027, and 1028 that delivers air to the tube members 102. The air pressure manifold 1010 can also include an air intake portion 1020 and valves or connectors 1030, such as T-connectors, that join each tube in each tube member 102. Fans can also be part of the air pressure manifold 1010 to help control the air pressure P1, P2, P3, and P4 in each of the one portions 1025, 1026, 1027, and 1028, respectively. These pressures in the portions of the manifold 1010 can correlate directly to pressures within each type of tube. For example, the first portion 1025 can provide air to the first tubes 1 within the array of tube members, and the second portion 1026 can provide air to the second tubes 2 in the array.

The fans shown along each portion can be propeller fans that are driven by motors. The rate and direction in which the propellers in the fans rotate can be controlled by a controller, and thus specific tubes in the array of tubes can be inflated or deflated to achieve the desired combination of radiation transmission, air flow, and heat transfer. In some implementations, the fans can rotate in more than one direction, such as in a forward and a backwards direction. When a fan is capable of rotating backwards, actuating the fan in the backwards mode can allow for faster deflation of specific tubes within the tube array. For example, if the second tubes 2 take five minutes to deflate when the fan providing air to those tubes is shut off, it can take as little as 30 seconds for those same second tubes 2 to deflate when the associated fan is run in reverse. In such configurations, various modes, such that the fans can only have on or off modes; on, off, and reverse modes; on at various speeds and off modes; or on at various speeds, off, and reverse modes. Air pressure manifolds 1010 that include fans that are capable of operating in reverse mode can be built of materials that are rigid enough to avoid collapse when the fans are run in reverse.

FIG. 10B shows a top down schematic of the system shown in FIG. 10A. The tube members 102 are shown fully inflated with the means to seal 1015 also in use, between the tube members 102 and the wall. As can be seen, the floor of the structure is obscured, such that a reduced amount of light, depending upon the nature of the second tube, will reach the floor below. However, the heat accumulated prior to fully inflating the second tube in each of the tube members 102, can be trapped because convection of the air in the structure will be obstructed from leaving the structure by the ceiling created by the inflated tube array. In the configuration shown in FIG. 10B, the size and shape of the first tubes 1 serve to arrest convection and air flow, while the materials and shape of the subsequent tubes, particularly second tubes 2, can occlude radiation from reaching the volume below the ceiling created by the tube array.

FIG. 11 illustrates an alternate implementation of the light diffuser and thermal insulation system 200, in which all tubes except first tube 1 are deflated and where the reflective inner tube 2 attaches to the outer tube 1 near the top and near the bottom of each tube set. The non-inflated, reflective second tube 2, with equal air pressure from both sides of first tube 1, will be flat or planar, and act as a light diffuser for passage of solar energy into a structure. Inflated first tubes 1 allow for limited, controlled escape of thermal energy from inside the structure. The minimum circumference of second tube 2 is substantially $2\pi R$, where 2R is the spacing between tube sets so that the sides of second tube 2 may contact the sides of first tube 1 when second tube 2 is fully inflated. This minimal circumference of second tube 2 requires that the circumference of first tube 1 be at least $4(\pi-1)R$, (i.e. 8.57R). The resulting height of contact between adjacent first tubes 1 is $(\pi-2)R$, (i.e. 1.14R). In yet other implementations, first tube 1 can have a greater circumference (not shown), which will induce cusps in first tube 1 where first tube 1 attaches to the upper and lower portions of deflated second tube 2 and thereby induce a tension in deflated second tubes 2.

If the light diffuser and thermal insulation system 200 were to be mounted under an angled or curved structure, the array of first tubes 1 can be substantially angled or curved accordingly, while second tubes 2, when deflated, can have an angle within the first tubes 1 that is substantially perpendicular or normal to the angle or curvature of the overhead structure. However, this angle can be manipulated by imposing a curvature on the deflated second tube 2 with differential pressure in the first tube 1 on one or either side of the second tube 2.

FIG. 12 illustrates yet another alternate implementation of the light diffuser and thermal insulation system 200 as in FIG. 11, in which a second tube 2 is connected to a top and bottom of an inner surface of an outer first tube 1. The second tube 2 shown is deflated. The pressure inside first tube 1 to one side A (i.e. the left) of deflated second tube 2 is slightly higher than the pressure inside first tube 1 to the opposite side B (i.e. the right) of deflated second tube 2. This differential pressure creates a curvature in deflated second tube 2, which can provide further light-guiding functions. In some implementations, the differential pressure can be controlled from slight to a high differential, to control the extent of curvature of the deflated and planar second tube 2. For example, as the differential pressure increases, the curvature in deflated second tube 2 increases as does the tension in deflated second tube 2 and the cusps in first tube 1. A pressure manifold, as in FIG. 10A and FIG. 10B, can be employed with independent air pressure feeds to both sides, as defined by partitioning second tube 2, within tube 1 to create sides A and B. This difference in pressure that exists between these two sides can be controlled by this pressure manifold.

FIG. 13 illustrates an implementation of the light diffuser and thermal insulation system 200 as in FIG. 11, in which inner tubes 2, 3, and 4 are fully inflated. In this implementation, the circumference of second tube 2 is substantially 2πR, where 2R is the spacing between tube sets, and the circumference of first tube 1 is 4(π−1)R, (i.e. 8.57R). The resulting height of contact surface between adjacent first tubes 1 is 1.47R.

Figure 14A:
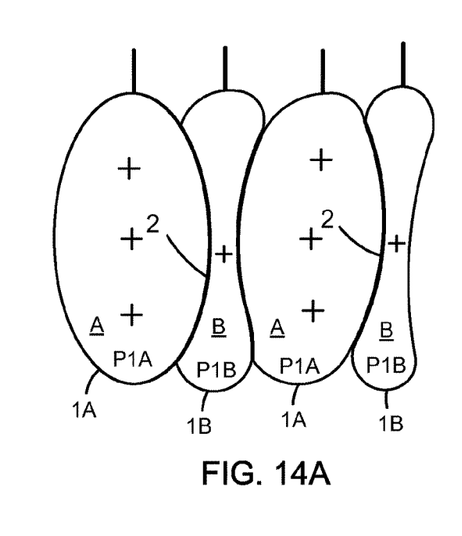
FIG. 14 illustrates a light diffuser and thermal insulation system showing various ways of curving a deflated inner tube or providing an asymmetrical, at least partially inner tube, using differential pressure in the outer tube.
Figure 14B:
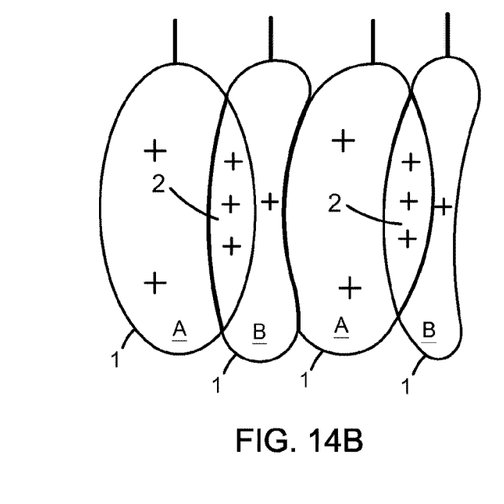

FIGS. 14A and 14B illustrate various modes of curving a second tube 2 within a first tube 1. In FIG. 14A, the second tube 2 is completely or nearly completely deflated. The left A and right B portions of the first tube 1, as defined by the second tube 2 as a boundary, have pressures sufficient to cause the second tube 2 to be substantially flat. The pressure P1A within the first tube 1 on the left hand side A is shown as greater than the pressure P1B within the first tube 1 on the right hand side B in FIG. 14A. This inequality in pressures between P1A and P1B causes side B to be smaller than side A and gives a curvature to the boundary between sides A and B. This curvature causes the flattened second tube 2 to become a curved reflective or obstructive surface, depending on the nature of the material of second tube 2. This curvature in the second tube 2 can be tailored by varying the pressure difference between sides A and B. It can be desirable to vary the curvature in the second tube 2 to adjust for the motion of the sun during the course of a day, different weather patterns, sudden shifts in temperature, or the like.

FIG. 14B shows a configuration in which there is a finite pressure within the second tubes 2 that is greater than either of the pressures in side A or B of the first tubes 1. This pressure within the second tubes 2, in conjunction with the fact that the tube members are connect at the top and the bottom, causes the cross-section of these tubes to appear lens shaped. The ability to vary the pressures in sides A and B of the first tubes 1 as well as the pressure in the second tubes 2 can allow for providing shade in a variable manner as well as to possibly redirect solar radiation. Because of the necessity of the first tubes 1 being inflated to a degree such that each of the first tubes 1 pushes against its neighbor, the configurations shown in FIGS. 14A and 14B may not allow for much, if any, air movement between the volume above the ceiling created by the tube array and the volume below.

In both FIGS. 14A and 14B, separate fans can be used to provide air to the A and B sides of the first tubes 1, as well as to the second tubes 2, in some cases. These fans can each operate in on-off modes or in various speeds in the on state-off modes.

Figure 15:
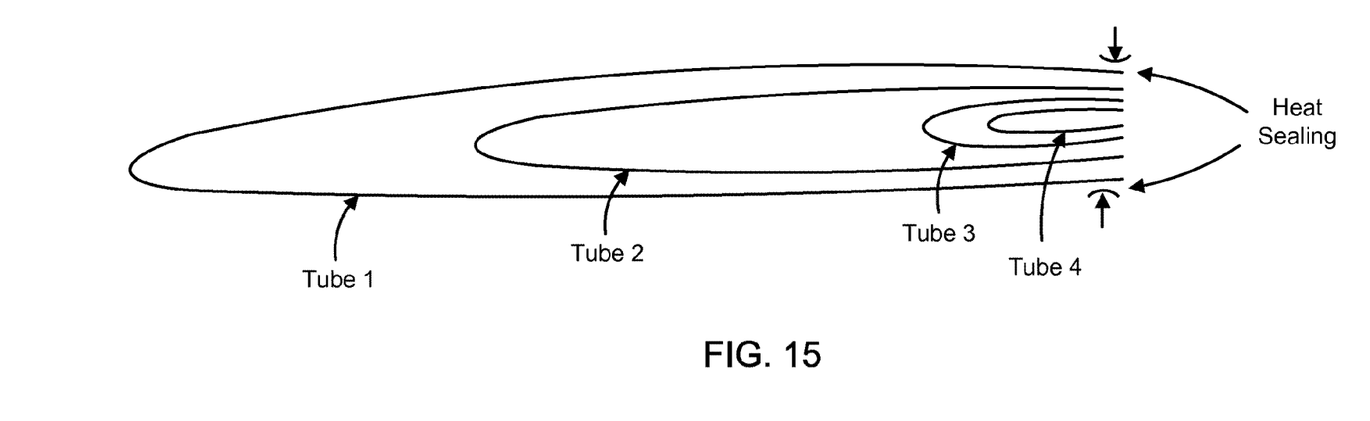
FIGS. 15 and 16 illustrate various techniques for manufacturing a light diffuser and thermal insulation system in accordance with implementations described herein.

For the implementations shown in FIGS. 1, 2, and 6-10, i.e. where the second and other inner tubes are connected at only one end within a first tube, the system can be manufactured by folding film sheets over each other, and heat-sealing only one end, such that each of the sheets, including the inner sheets, are independently inflatable. This technique for manufacturing the tubes is illustrated in FIG. 15.

Figure 16:
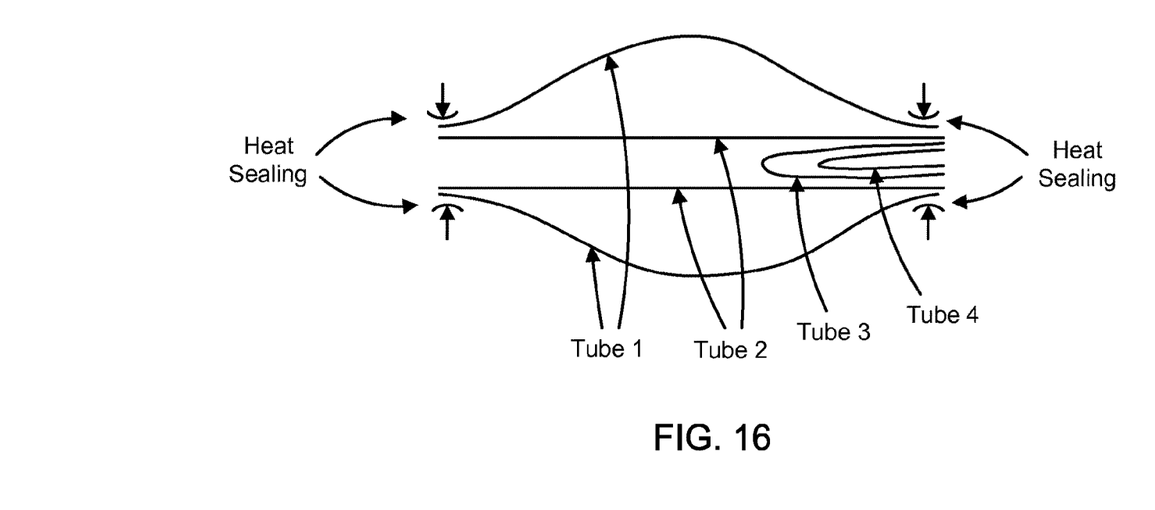

For implementations where at least only a second inner tube is connected on opposite ends within a first, outer tube, two or more pairs of sheets can be provided face-to-face, and the pairs can be heat sealed on both ends. Any inner tubes that are not connected on both ends can be formed by heat sealing only on one side, as above. This technique for manufacturing the tubes is illustrated in FIG. 16.

Although a few implementations have been described in detail above, other modifications are possible. Other embodiments may be within the scope of the following claims.

The invention claimed is:

1. An apparatus for controlling light shading and thermal insulation in a light transmissive structure, the apparatus comprising:
   an array of adjacently-positioned, inflatable first tubes, each of the first tubes being inflatable to abut an inflated adjacent first tube;
   an array of inflatable second tubes, each of the second tubes being nested within, and inflatable independent of, one of the first tubes, each of the second tubes being connected such that when no inflated, each of the second tubes is flattened and substantially vertical within the one of the first tubes, and when inflated, each of the second tubes abut an inflated adjacent second tube via first tubes; and
   an array of inflatable third tubes, each of the third tubes being nested within, and inflatable independent of, one of the second tubes.

2. The apparatus in accordance with claim 1, wherein at least some of the first tubes are translucent.

3. The apparatus in accordance with claim 2, wherein at least some of the second tubes are opaque.

4. The apparatus in accordance with claim 3, wherein each of the second tubes are inflatable to block passage of light through the inflated second tubes.

5. The apparatus in accordance with claim 1, wherein a portion of at least some of the second tubes is opaque.

6. The apparatus in accordance with claim 5, wherein the portion includes a top half of the at least some of the second tubes.

7. The apparatus in accordance with claim 1, further comprising an array of inflatable fourth tubes, each of the fourth tubes being nested within, and inflatable independent of, one of the third tubes.

8. An apparatus for controlling light shading and thermal insulation in a light transmissive structure, the apparatus comprising:
   an array of adjacently-positioned, inflatable first tubes, each of the first tubes being inflatable to abut an inflated adjacent first tube;
   an array of inflatable second tubes, each of the second tubes being connected to both a top and bottom of an inner surface, and inflatable independent of, one of the first tubes, each of the second tubes being connected such when not inflated, each of the second tubes is flattened and substantially longitudinal within the one of the first tubes, and when inflated, each of the second tubes abut an inflated adjacent second tube via first tubes; and opposing chambers of the first tubes opposite the second tubes are independently inflatable to create a pressure differential there between, the pressure differential causing a curvature in the non-inflated second tube away from a chamber with a greater pressure to provide a controlled light guiding by the second tube.

9. The apparatus in accordance with claim 8, wherein each of the first tubes is clear, and wherein each of the second tubes is reflective.

\* \* \* \* \*